(12) United States Patent
Lewis (10) Patent No.: US 9,464,905 B2
(45) Date of Patent: Oct. 11, 2016

(54) OVER-THE-AIR VEHICLE SYSTEMS UPDATING AND ASSOCIATE SECURITY PROTOCOLS

(75) Inventor: Derek Lane Lewis, Ida, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1392 days.

(21) Appl. No.: 12/823,301

(22) Filed: Jun. 25, 2010

(65) Prior Publication Data

US 2011/0320089 A1 Dec. 29, 2011

(51) Int. Cl.
| G01M 17/00 | (2006.01) |
| G06F 7/00 | (2006.01) |
| G06F 19/00 | (2011.01) |
| G01C 21/32 | (2006.01) |
| H04L 9/08 | (2006.01) |
| H04L 9/32 | (2006.01) |

(52) U.S. Cl.
CPC ............. *G01C 21/32* (2013.01); *H04L 9/0891* (2013.01); *H04L 9/3226* (2013.01)

(58) Field of Classification Search
CPC .............................. H04L 9/3226; H04L 9/089
USPC ...................................................... 701/32, 29
See application file for complete search history.

(56) References Cited

U.S. PATENT DOCUMENTS

| 6,130,622 | A * | 10/2000 | Hussey ................... B60R 25/24 235/382 |
| 6,493,616 | B1 | 12/2002 | Rossow et al. |
| 6,728,603 | B2 | 4/2004 | Pruzan et al. |
| 7,092,803 | B2 | 8/2006 | Kapolka et al. |
| 7,149,206 | B2 | 12/2006 | Pruzan et al. |
| 7,233,814 | B2 | 6/2007 | Wissinger et al. |
| 7,283,904 | B2 | 10/2007 | Benjamin et al. |
| 7,346,370 | B2 | 3/2008 | Spaur et al. |
| 7,418,596 | B1 | 8/2008 | Carroll et al. |
| 2005/0065628 | A1* | 3/2005 | Roose ................. A61F 2/30942 700/117 |
| 2005/0065678 | A1 | 3/2005 | Smith et al. |
| 2005/0137796 | A1 | 6/2005 | Gumpinger |
| 2006/0047381 | A1 | 3/2006 | Nguyen |
| 2007/0106430 | A1* | 5/2007 | Goto ......................... G06F 8/64 701/1 |
| 2008/0140278 | A1 | 6/2008 | Breed |
| 2008/0176510 | A1 | 7/2008 | Yuhara et al. |
| 2009/0119657 | A1* | 5/2009 | Link, II .................... G06F 8/65 717/171 |
| 2009/0296934 | A1* | 12/2009 | Qing ..................... H04W 12/04 380/277 |
| 2010/0005280 | A1 | 1/2010 | Wagner et al. |
| 2010/0048193 | A1 | 2/2010 | Ortion et al. |

* cited by examiner

Primary Examiner — Imran Mustafa (74) Attorney, Agent, or Firm — Dinsmore & Shohl, LLP (57) ABSTRACT

A method of updating a vehicle ECU includes establishing communication between a data communications module of a vehicle and an update server via a cellular network; validating the vehicle using a key exchange protocol between the data communications module and the update server; and sending update information from the update server to the data communications module of the vehicle via the cellular network, the update information configured to be used to update the vehicle ECU.

19 Claims, 7 Drawing Sheets

OVER-THE-AIR VEHICLE SYSTEMS UPDATING AND ASSOCIATE SECURITY PROTOCOLS

TECHNICAL FIELD

The present specification generally relates to automated vehicle systems updating, and more particularly to over-the-air vehicle systems updating and associated security protocols.

BACKGROUND

Vehicles, such as cars and trucks, are becoming increasingly computer controlled. Many operating characteristics are generally based on computer algorithms that are pre-programmed into various electronic control units (ECUs). The ECUs control one or more of the electrical systems or subsystems in the vehicle. Managing the increasing complexity and number of ECUs in a vehicle has become a key challenge for vehicle manufacturers.

Currently, if there are any software or ECU issues with the vehicle or updates to the software or ECUs are available, the customer must drive or somehow transport the vehicle to a dealer for service. This can be inconvenient for the customer. Accordingly, a need exists for more convenient ways to update vehicle software and ECUs.

SUMMARY

In one embodiment, a method of updating a vehicle ECU includes establishing communication between a data communications module of a vehicle and an update server via a cellular network; validating the vehicle using a key exchange protocol between the data communications module and the update server; and sending update information from the update server to the data communications module of the vehicle via the cellular network, the update information configured to be used to update the vehicle ECU.

In another embodiment, an over-the-air system for updating a vehicle includes an update server including update information for use in updating a vehicle ECU. A data communications module on a vehicle is configured to communicate with the update server via a cellular network for receiving the update information from the update server. A diagnostic ECU is configured to communicate with the data communications module for receiving the update information from the data communications module. A vehicle ECU is configured to communicate with the diagnostic ECU for receiving update information from the diagnostic ECU.

In another embodiment, a method of updating a vehicle ECU includes establishing communication between a data communications module of a vehicle and an update server via a cellular network; sending a security key from the data communications module of the vehicle to the update server; and sending update information from the update server to the data communications module of the vehicle via the cellular network if the security key is valid.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to over-the-air (OTA) updating of vehicle systems and associated security protocols that can be used to validate an update source, update destination and/or the update communications themselves. The OTA updating systems and methods may utilize a data communications module (DCM) that provides a connection to update servers, for example, through a cellular network. The DCM may receive various updates from the update servers OTA (e.g., without any need for visiting a dealership or physical connection to a diagnostic device) that can be used to reprogram the vehicle's ECUs. A security protocol may be provided that is used to validate the source and destination of the update communications. The DCM may be connected to a diagnostic ECU capable of communicating with the vehicle ECUs, for example, via a controller area network (CAN).

Figure 1:
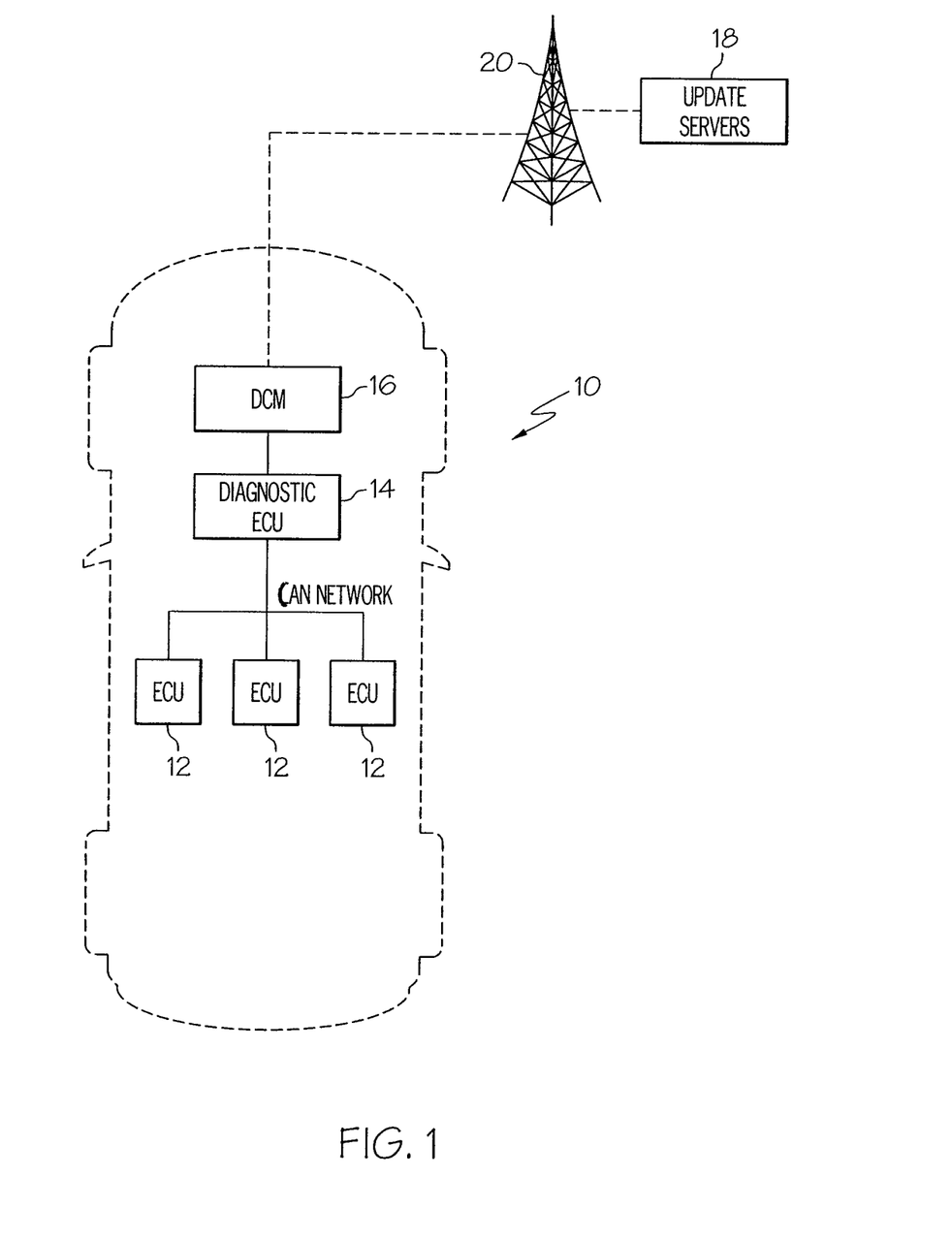
FIG. 1 is a diagrammatic view of over-the-air updating of a vehicle according to one or more embodiments shown and described herein.

Referring to FIG. 1, a vehicle 10 (represented by dotted lines) may include a number of vehicle ECUs 12. As used herein, a vehicle ECU refers to any embedded system that controls one or more of the electrical systems or subsystems in a motor vehicle. Exemplary vehicle ECUs include Airbag Control Units (ACU), Body Control Modules that control door locks, electric windows, courtesy lights, etc., Convenience Control Units (CCU), Door Control Units, Engine Control Units (ECU), Man Machine Interfaces (MMI), On-Board Diagnostics (OBD), Powertrain Control Modules (PCM), Seat Control Units, Speed Control Units, Telephone Control Units (TCU) that dial the telephone, Transmission Control Units (TCU), and the like. A diagnostic ECU 14 is provided that reprograms one or more of the vehicle ECUs 12 based on update information received via a communications link provided via a DCM 16. The DCM 16 (e.g., vehicle telematics) provides the communications link to update servers 18 containing the update information, for example, through a cellular network 20.

Update information may be used to reprogram one or more of the vehicle ECUs 12 in order to modify one or more of the vehicle's systems. Some examples of modifications that can be made using the update information include fuel injection, ignition, water temperature correction, transient fueling, cam timing, gear control, and the like.

Figure 2:
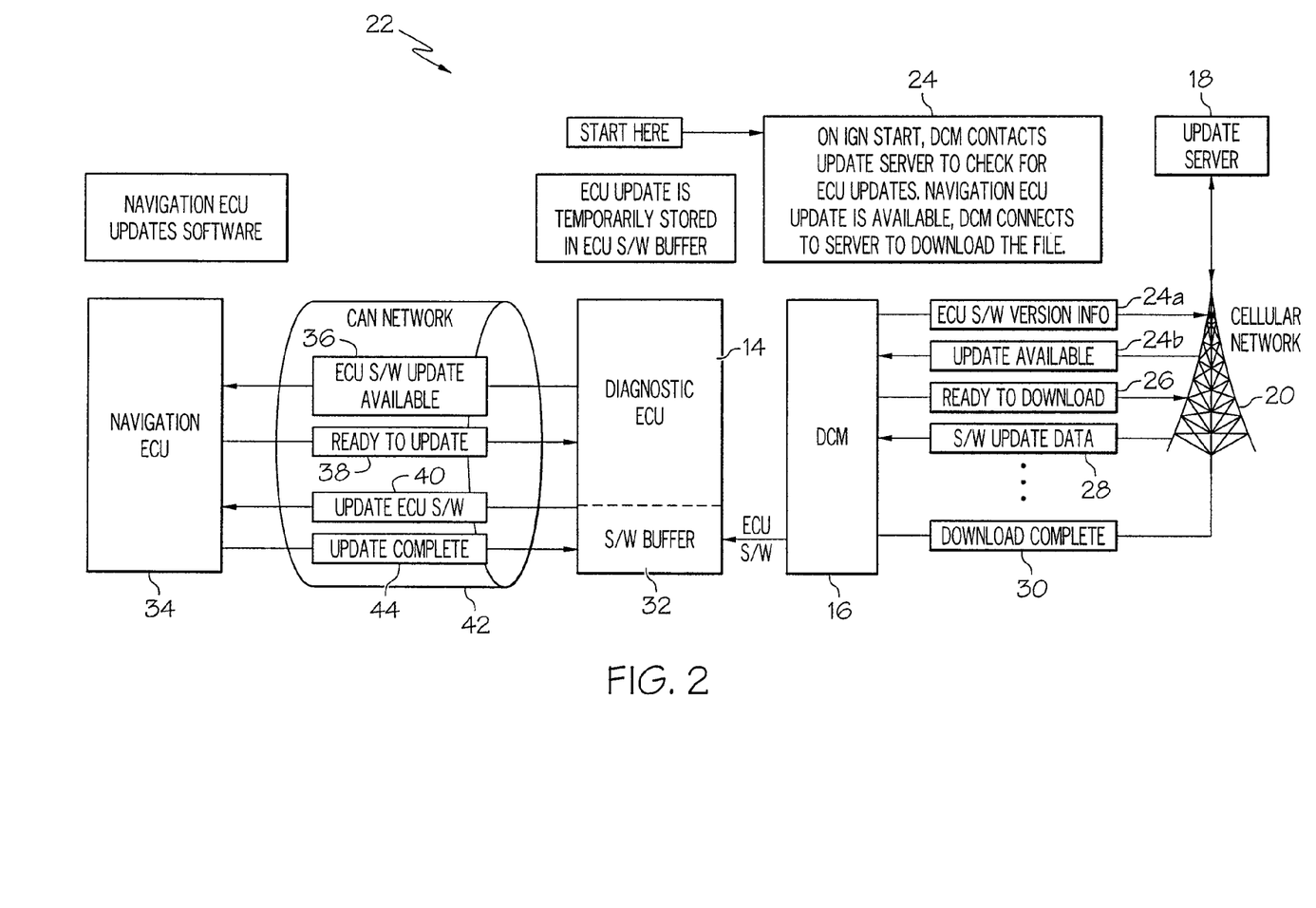
FIG. 2 illustrates a method of over-the-air updating of a vehicle using a data communications module according to one or more embodiments shown and described herein.

Referring to FIG. 2, an exemplary method 22 for providing an update OTA includes the DCM 16 contacting the update servers 18 via the cellular network 20 at step 24 to determine whether an update is available. In the example of FIG. 2, the DCM 16 may contact the update servers 18 upon ignition start of the vehicle 10. In another embodiment, the DCM 16 may contact the update servers 18 at some other time, such as upon the operator's request. This determination step 24 may include one or more substeps such as at step 24a, the DCM 16 may send current ECU update version and VIN number information to the update servers 18, which may be used in determining whether an update is available for that particular requesting vehicle. If an update is available, at step 24b, an indication of the availability of an update may be provided to the DCM 16. At step 26, the DCM 16 may provide an indication to the update servers 18 that it is ready for the update download. The update servers 18 may then send the update information to the DCM 16 at step 28 and a download complete message may be sent from the DCM 16 to the update servers 18 at step 30.

The update information may be provided from the DCM 16 to a software buffer 32 for temporary storage of the update information. The diagnostic ECU 14 may control storage and delivery of the update information that is saved in the software buffer 32. In some embodiments, the update information may include data for use by the diagnostic ECU 14 in determining the type of update that is available. In FIG. 2, for example, the update information is for updating a navigation ECU 34 (e.g., with map information and the like). Once the destination is determined by the diagnostic ECU 14, the diagnostic ECU 14 notifies the navigation ECU 34 that an update is available at step 36 and the navigation ECU 34 notifies the diagnostic ECU 14 that it is ready to receive the update information at step 38. At step 40, the diagnostic ECU 14 provides the update information over the CAN 42 to the navigation ECU 34, which is used to update the navigation ECU 34. A message may be sent from the navigation ECU 34 to the diagnostic ECU 14 that the update is complete at step 44.

Figure 3:
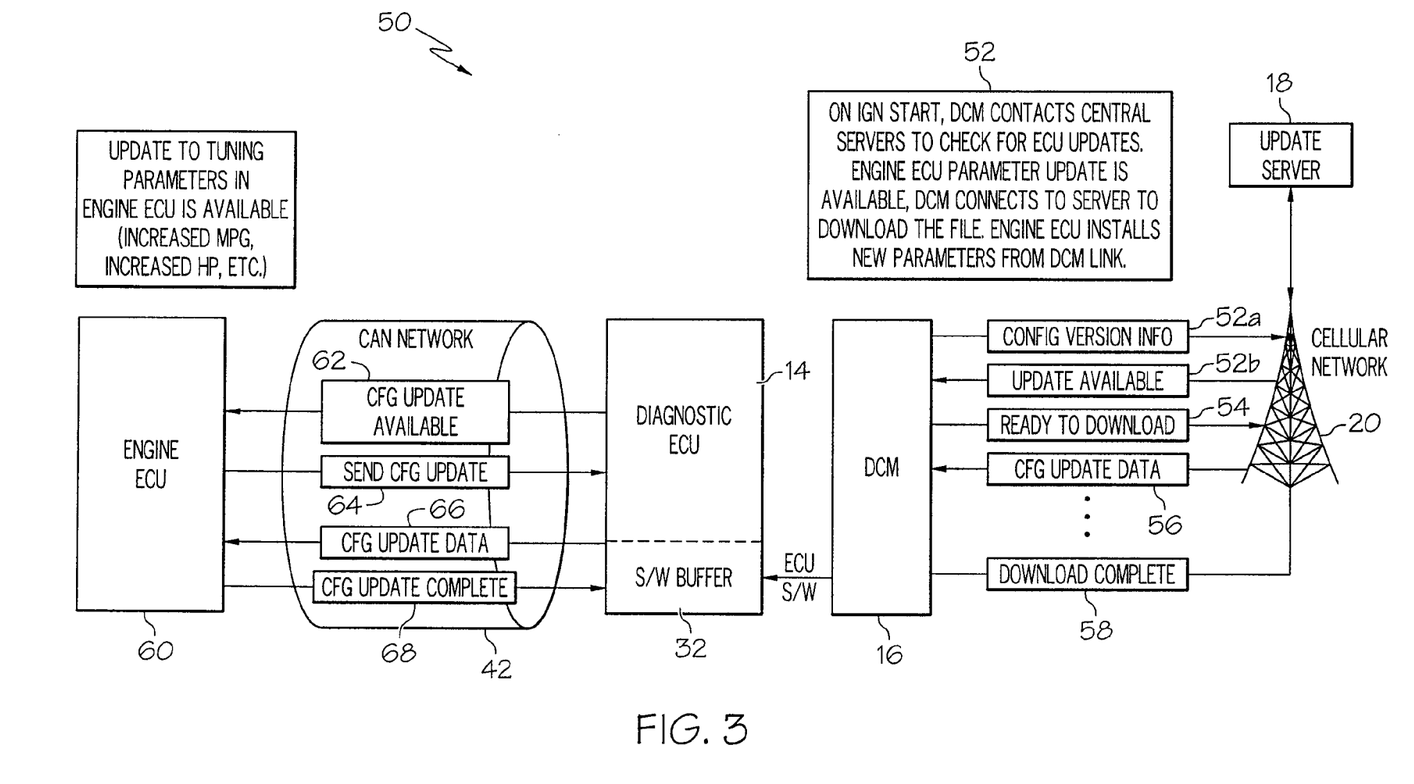
FIG. 3 illustrates another method of over-the-air updating of a vehicle using a data communications module according to one or more embodiments shown and described herein.

The OTA updating systems may also be used to calibrate or reconfigure various vehicle systems, such as the engine, brakes, lights, climate control, etc. Referring to FIG. 3, another exemplary method 50 for providing an update OTA includes the DCM 16 contacting the update servers 18 via the cellular network 20 at step 52 to determine whether a configuration update is available. The DCM 16 may contact the update servers 18 upon ignition start of the vehicle 10 or at other times, such as upon operator command. This determination step 52 may include one or more substeps such as at step 52a, the DCM 16 may send current ECU update version information and VIN number information to the update servers 18, which may be used in determining whether a configuration update is available. If a configuration update is available, at step 52b, an indication of the availability of an update may be provided to the DCM 16. At step 54, the DCM 16 may provide an indication to the update servers 18 that it is ready for the update download. The update servers 18 may then send the configuration update information to the DCM 16 at step 56 and a download complete message may be sent from the DCM 16 to the update servers 18 at step 58.

The configuration update information may be provided from the DCM 16 to the software buffer 32 for temporary storage of the configuration update information. The diagnostic ECU 14 may control storage and delivery of the configuration update information that is saved in the software buffer 32. In some embodiments, the configuration update information may include data for use by the diagnostic ECU 14 in determining the type of configuration update that is available. In FIG. 3, for example, the configuration update information is for reconfiguring an engine ECU 60 (e.g., fuel injection and the like). Once the destination is determined by the diagnostic ECU 14, the diagnostic ECU 14 notifies the engine ECU 60 that an update is available at step 62 and the engine ECU 60 notifies the diagnostic ECU 14 that it is ready to receive the update information at step 64. At step 66, the diagnostic ECU 14 provides the configuration update information over the CAN 42 to the engine ECU 60, which is used to reconfigure the engine ECU 60. A message may be sent from the engine ECU 60 to the diagnostic ECU 14 that the update is complete at step 68.

Figure 4:
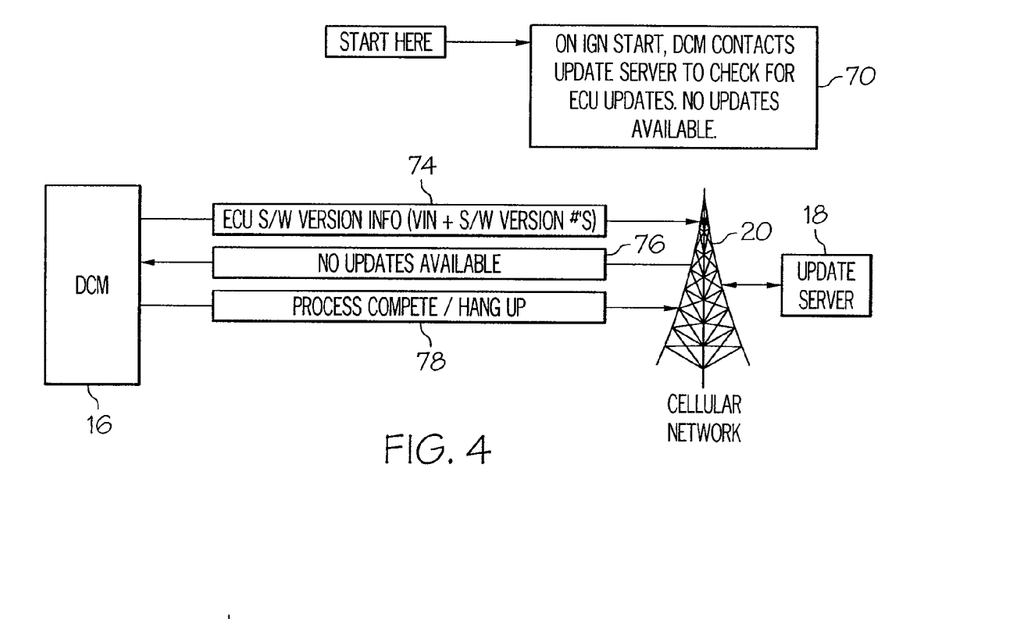
FIG. 4 illustrates an over-the-air updating method where no updates are available according to one or more embodiments shown and described herein.

Referring to FIG. 4, in some instances, an update may not be available for a vehicle (e.g., the vehicle may have the most recent software versions and calibration data). At step 70, the DCM 16 may contact the update servers 18 via the cellular network 20 to determine whether a configuration update is available. At step 74, the DCM 16 may provide ECU software/calibration version information and VIN information to the update servers 18. The update servers 18, upon a determination that the vehicle has the current versions, may provide an indication to the DCM 16 that no updates are available at step 76. The DCM 16 may then discontinue the connection with the update servers 18 at step 78.

Figure 5:
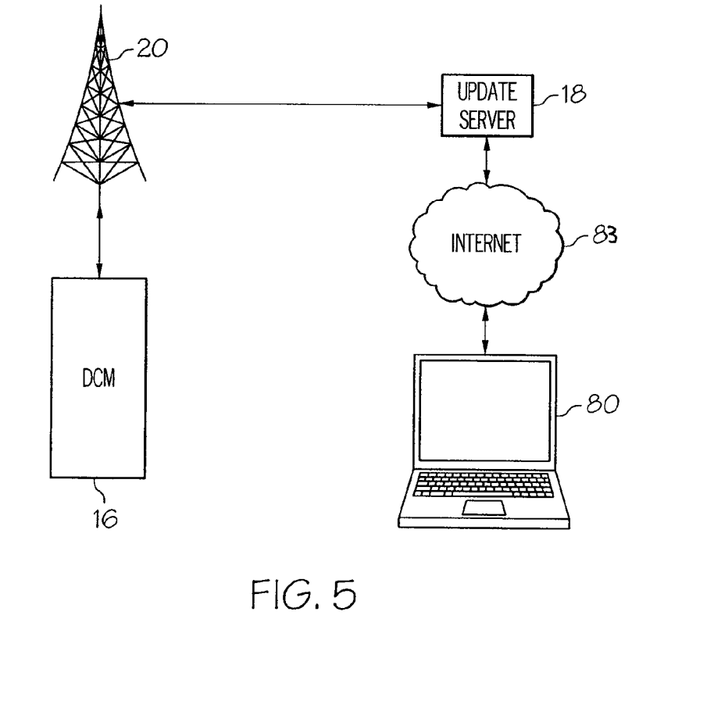
FIG. 5 illustrates another method of over-the-air updating of a vehicle using a data communications module according to one or more embodiments shown and described herein.

Referring to FIG. 5, while the OTA update procedures my be initiated from the vehicle, in other embodiments, the OTA updates may be initiated from outside the vehicle, such as using a personal computer 80, hand-held device such as a cellular phone, etc. For example, the personal computer 80 may have access to the update servers 18 via the Internet 83. The computer 80 may include software for interacting with the update servers 18, for example, to determine which updates have been downloaded and what updates are available for the vehicle. The vehicle owner (or other person) may select updates on the computer 80 to be downloaded to the vehicle, for example, upon ignition of the vehicle in a process similar to that discussed above with regard to FIGS. 2 and 3. In some of these embodiments, the steps for determining whether updates are available from the vehicle may be skipped and the update servers 18 may provide the selected updates to the DCM 16.

Figure 6:
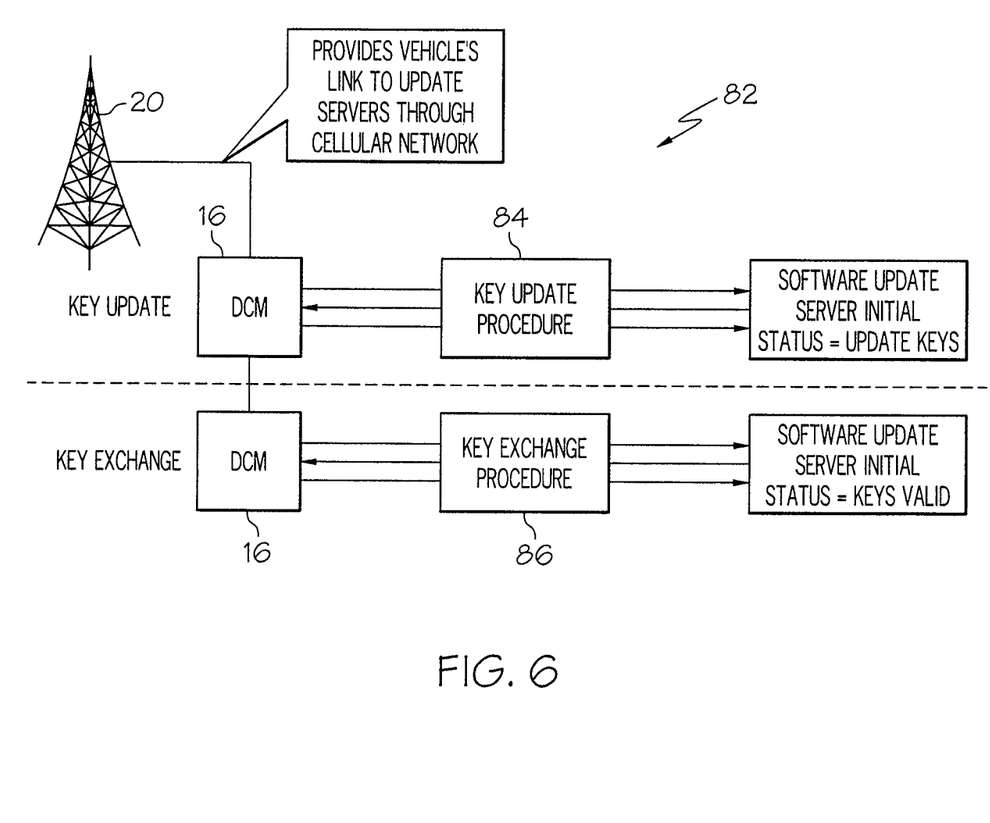
FIG. 6 illustrates an exemplary security protocol for validating update communications according to one or more embodiments shown and described herein.

Referring to FIG. 6, one embodiment of an exemplary security protocol 82 may be provided to validate communications between the DCM 16 and the update servers 18. The security protocol 82 may include a key update procedure 84 for updating a security key and a key exchange procedure 86 for exchanging the security key between the update servers 18 and the DCM 16.

Figure 7:
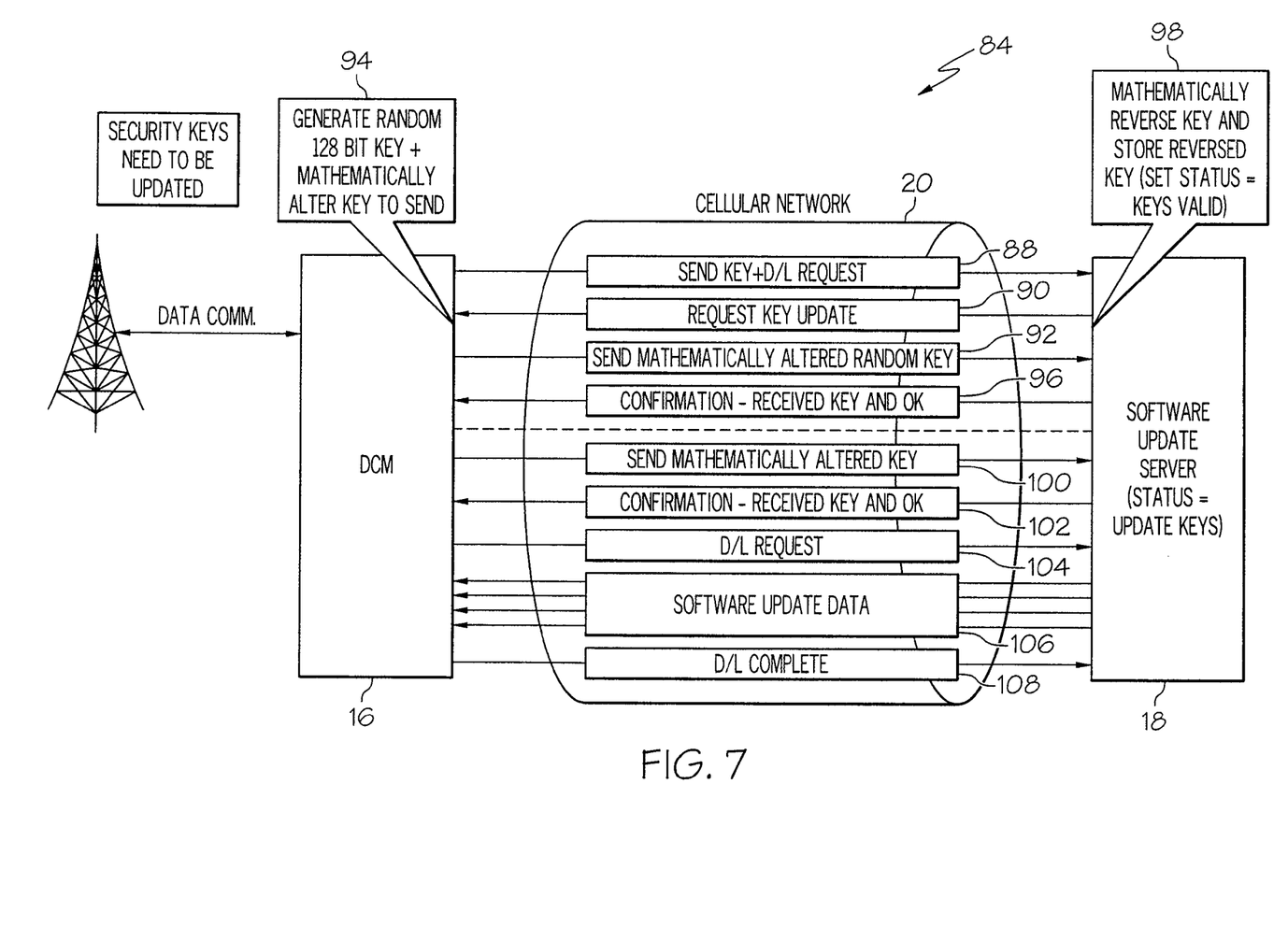
FIG. 7 illustrates an exemplary security key update and security key exchange protocol for update communications according to one or more embodiments shown and described herein.

FIG. 7 illustrates an exemplary key update procedure 84 where a security key is updated prior to an update procedure. At step 88, the DCM 16 may send a first security key along with an update request to the update servers 18 via the cellular network 20. In this example, the update servers 18 request an updated security key from the DCM 16 at step 90.

There may be any number of reasons that the update servers 18 might request a new security key from the DCM 16. For example, the first security key may be expired (e.g., keys may expire after a preselected period of time). As another example, the first security key may be compromised. As another example, the vehicle may not have previously initiated an update procedure (e.g., the vehicle may be new). At step 92, the DCM 16 sends a second security key to the update servers 18. In some embodiments, the DCM 16 may include an algorithm that is used to reversibly alter the second security key at step 94. The second security key may be selected from a list of valid security keys saved in memory of the DCM 16. In another embodiment, the second security key may be generated randomly (e.g., 128 bit key). The altered second security key may be sent from the DCM 16 to the update servers 18 at step 92. At step 98, the altered second security key may be decrypted at the update servers 18, saved in memory and set as a valid security key. A confirmation that the second security key is valid may be sent from the update servers 18 to the DCM 16 at step 96.

Once the second security key is set to valid, the DCM 16 may again send a mathematically altered second security key for an updating procedure at step 100. At step 102, the update servers 18 may decrypt the second security key and send a confirmation and valid key message to the DCM. At step 104, the DCM 16 may request an update in a fashion similar to that described above. The update servers 18 may then send the update information at step 106 and the DCM 16 may send a confirmation that the download is complete at step 108. Thus, the second security key may be used to validate the vehicle to the update servers 18 and the update servers 18 (i.e., the update source) to the vehicle. If the update servers 18 do not receive a valid security key from the vehicle once the key status has been validated, the update servers 18 may sever the connection with the vehicle. Likewise, if the DCM 16 does not receive the appropriate confirmations from the update servers 18, the DCM 16 may sever the connection.

Figure 8:
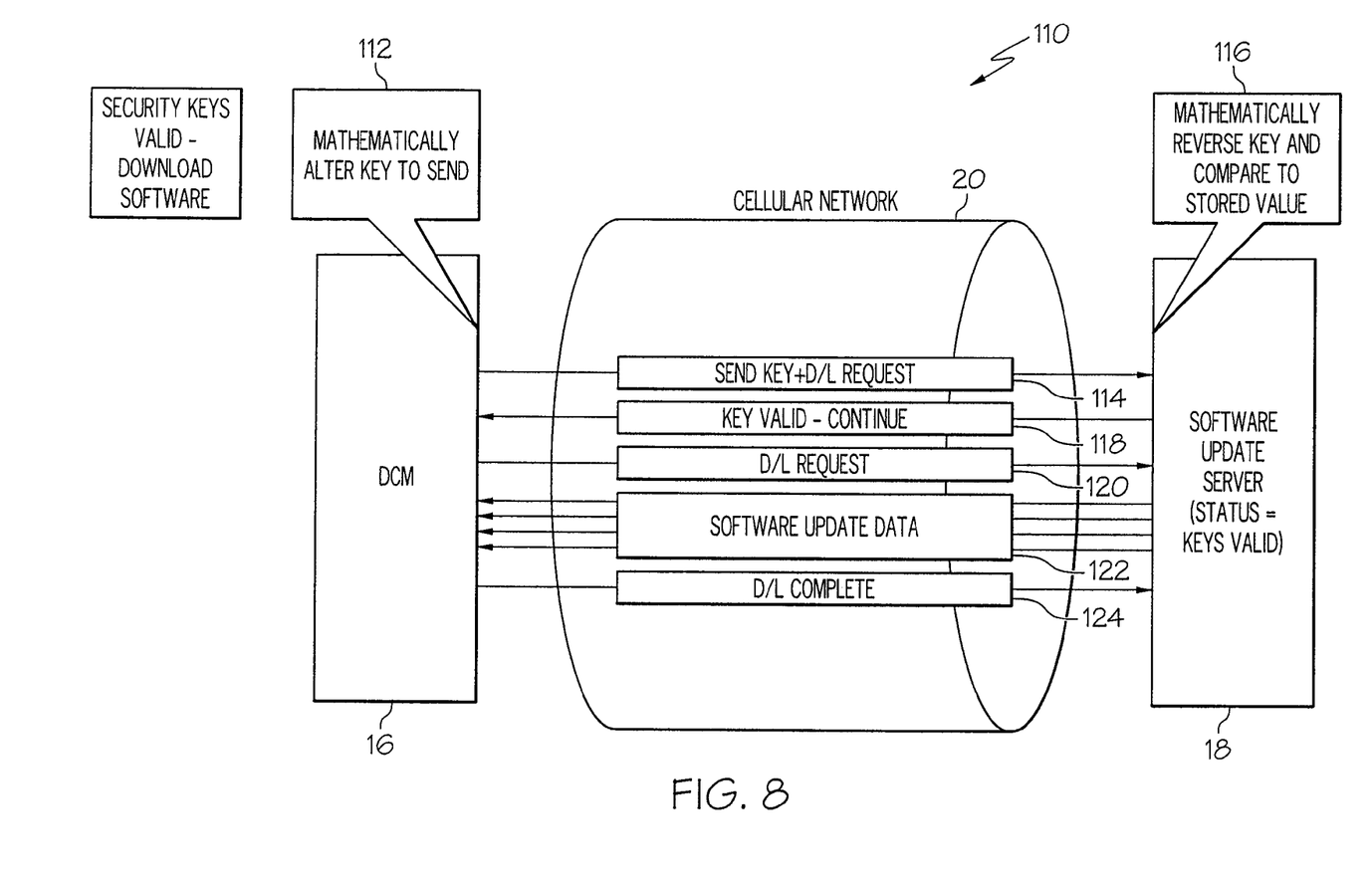
FIG. 8 illustrates an exemplary security key exchange protocol for update communications according to one or more embodiments shown and described herein.

Referring to FIG. 8, an exemplary key exchange procedure 110 is illustrated where the key update procedure 84 has already been performed and the security key in use by the DCM 16 has been set to valid at the update servers 18. At step 112, the security key is mathematically altered and the altered security key is sent to the update servers 18 by the DCM 16 at step 114. At step 116, the update servers 18 may decrypt the security key and send a confirmation and valid key message to the DCM 16 at step 118. At step 120, the DCM 16 may send an update download request to the update servers 18, which may also include current update information. If an update is available, the update servers 18 may send the update to the DCM 16 at step 122. At step 124, the DCM 16 may send an indication to the update servers 18 that the download is complete.

The above-described OTA updating of vehicle systems and associated security protocols can be used to provide updates to the various ECUs (and other systems) without requiring a vehicle owner to transport the vehicle to a vehicle manufacturer, while also providing security protocols which can validate an update source, update destination and/or the update communications themselves. The OTA updating systems and methods may utilize the DCM that provides a connection to update servers, for example, through a cellular network.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of updating a vehicle ECU, the method comprising:
    establishing communication between a data communications module of a vehicle and an update server via a cellular network;
    validating the vehicle using a key exchange protocol between the data communications module and the update server, wherein the key exchange protocol includes the data communications module sending a first security key to the update server, receiving a request for an updated security key from the update server after sending the first security key, and sending a second security key to the update server after receiving the request for the updated security key; and
    sending update information from the update server to the data communications module of the vehicle via the cellular network, the update information configured to be used to update the vehicle ECU.

2. The method of claim 1 further comprising the data communications module providing the update information to a diagnostic ECU.

3. The method of claim 2 further comprising the diagnostic ECU sending the update information to the vehicle ECU over a CAN network.

4. The method of claim 1, wherein the step of validating includes encrypting a security key and sending the encrypted security key from the data communications module to the update server.

5. The method of claim 1, wherein the vehicle ECU is a navigation ECU.

6. The method of claim 1, wherein the vehicle ECU is an engine control unit.

7. The method of claim 1 further comprising the data communications module sending current ECU update version information and VIN number information to the update server.

8. The method of claim 1 further comprising:
    sending the update information from the data communications module to a diagnostic ECU of the vehicle;
    sending the update information from the diagnostic ECU to the vehicle ECU; and
    updating the vehicle ECU with the received update information.

9. A method of updating a vehicle ECU, the method comprising:
    establishing communication between a data communications module of a vehicle and an update server via a cellular network;
    sending a first security key from the data communications module of the vehicle to the update server;
    receiving, at the data communications module, a request for an updated security key from the update server after the data communications module sends the first security key;
    sending a second security key from the data communications module to the update server after the data communications module receives the request for the updated security key; and
    sending update information from the update server to the data communications module of the vehicle via the cellular network if the second security key is valid.

10. The method of claim 9 further comprising the data communications module providing the update information to a diagnostic ECU.

11. The method of claim 10 further comprising the diagnostic module sending the update information to the vehicle ECU over a CAN network.

12. The method of claim 9, wherein the vehicle ECU is a navigation ECU.

13. The method of claim 9, wherein the vehicle ECU is an engine control unit.

14. The method of claim 9 further comprising the data communications module sending current ECU update version information and VIN number information to the update server.

15. An over-the-air system for updating a vehicle, the system comprising:
   an update server including update information for use in updating a vehicle ECU;
   a data communications module on a vehicle configured to communicate with the update server via a cellular network for receiving the update information from the update server;
   a diagnostic ECU on the vehicle configured to communicate with the data communications module for receiving the update information from the data communications module; and
   a vehicle ECU on the vehicle configured to communicate with the diagnostic ECU for receiving update information from the diagnostic ECU,
   wherein the data communications module includes a key exchange protocol saved in memory of the data communications module, the key exchange protocol configured to send a first security key to the update server, receive a request for an updated security key from the update server after sending the first security key, and send a second security key to the update server after receiving the request for the updated security key.

16. The system of claim 15, wherein the vehicle ECU communicates with the diagnostic ECU via a CAN network.

17. The system of claim 16, wherein the vehicle ECU is a navigation ECU.

18. The system of claim 16, wherein the vehicle ECU is an engine control unit.

19. The system of claim 15, wherein the data communications module includes a security protocol saved in memory of the data communications module, the security protocol configured to send an encrypted security key to the update servers to validate the vehicle.

* * * * *

UNITED STATES PATENT AND TRADEMARK OFFICE
CERTIFICATE OF CORRECTION

PATENT NO. : 9,464,905 B2  
APPLICATION NO. : 12/823301  
DATED : October 11, 2016  
INVENTOR(S) : Derek Lane Lewis Page 1 of 1

It is certified that error appears in the above-identified patent and that said Letters Patent is hereby corrected as shown below:

On the Title Page, Item (54) and in the Specification, Column 1, in the Title, delete "ASSOCIATE" and insert --ASSOCIATED--, therefor.

IN THE SPECIFICATION

In column 4, line 38, after "while the OTA update procedures", delete "my", insert --may--, therefor.

Signed and Sealed this  
Sixth Day of December, 2016

Michelle K. Lee  
*Director of the United States Patent and Trademark Office*